(12) United States Patent
Jolley et al.

(10) Patent No.: US 7,747,677 B2
(45) Date of Patent: Jun. 29, 2010

(54) SYSTEM AND METHOD FOR CONTROL TREE OPTIMIZATION

(75) Inventors: Christopher Jolley, Broomfield, CO (US); Purushotham Babu Naidu, Lafayette, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 903 days.

(21) Appl. No.: 11/196,071

(22) Filed: Sep. 22, 2005

(65) Prior Publication Data

US 2007/0244846 A1    Oct. 18, 2007

(51) Int. Cl.
    G06F 15/16    (2006.01)
(52) U.S. Cl. .................. 709/203; 715/742; 707/100
(58) Field of Classification Search .............. 709/203
    See application file for complete search history.

(56) References Cited

U.S. PATENT DOCUMENTS

| | | | |
|---|---|---|---|
| 7,117,216 B2 * | 10/2006 | Chakraborty et al. ....... 707/100 |
| 2004/0128618 A1 | 7/2004 | Datta |
| 2004/0168115 A1 | 8/2004 | Bauernschmidt et al. |
| 2005/0028089 A1 | 2/2005 | Aoki et al. |
| 2005/0097190 A1 | 5/2005 | Abdelhak |
| 2005/0192771 A1 * | 9/2005 | Fischer et al. .............. 702/122 |
| 2006/0036954 A1 * | 2/2006 | Satyadas et al. ............ 715/742 |

* cited by examiner

*Primary Examiner*—Vivek Srivastava
*Assistant Examiner*—Vivek Krishnan
(74) *Attorney, Agent, or Firm*—Fliesler Meyer LLP

(57) ABSTRACT

The present invention creates a partial control tree rather than a full control tree of a portal upon user's rendering request, wherein the partial control tree may contain only active controls in the portal while is still sufficient for rendering the portal. Such an approach improves performance and scalability characteristics of the portal, which depends on the size of the portal, i.e., number of controls on the portal. This description is not intended to be a complete description of, or limit the scope of, the invention. Other features, aspects, and objects of the invention can be obtained from a review of the specification, the figures, and the claims.

16 Claims, 19 Drawing Sheets

SYSTEM AND METHOD FOR CONTROL TREE OPTIMIZATION

CROSS-REFERENCE TO RELATED APPLICATIONS

This application is related to the following co-pending application which is hereby incorporated by reference in its entirety:

U.S. patent application Ser. No. 11/196,224. filed Aug. 3, 2005, entitled SYSTEM AND METHOD FOR CONTROL STATE MANAGEMENT by Christopher Jolley and Purushotham Babu Naidu.

U.S. patent application Ser. No. 11/196,723. filed Aug. 3, 2005, entitled SYSTEM AND METHOD FOR CONTROL TREE COMPRESSION by Christopher Jolley and Purushotham Babu Naidu.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of rendering of a portal upon user's request.

BACKGROUND

A portal is generally synonymous with a gateway for a website that is or proposes to be a major starting site for users when they get connected to the Web or tend to use an enterprise-level software solution. Portal performance is usually measured by the amount of time required to actually render that portal and all of its constituent parts once a visitor sends a request to a portal-side managing component for the portal such as a portal servlet by, for a non-limiting example, clicking an object on the screen. Any number of reasons can negatively impact the anticipated performance of the portal. Like any other software product, portal's performance problems may not be the result of flaws in the product itself but rather the result of poor decisions made during the design phase of the portal, such as its layout and design, which directly affect its performance. Proper planning would allow a user to take advantage of the inherent strengths of product to ensure optimal performance for the portal.

A portal may execute three main operations to serve a portal request via its controls:

When a portal is instantiated, a meta control hierarchy (which can be a meta control tree) can be created from, for a non-limiting example, an XML markup file that represents the portal and cached (if the tree has not been cached earlier). Each node in the hierarchy (tree) represents a control and its information such as control's subclass name and set of (properties) name/value pairs. The more controls the portal has, the larger its control tree, is going to be. FIG. 1 depicts an exemplary control tree of a portal with 1 desktop, creates 1 main book, 40 books, 400 pages and 4000 portlets, a total of 4442 controls (nodes). The inclusion of buttons, windows, menus, and layouts will increase the number of controls on the portal significantly.

Upon every request from a user, a control tree can be created from the meta control tree, and cannot be reused to serve subsequent requests. Note that all nodes in the meta control tree are of the same type, while the control tree may contain different types of nodes.

Once the control tree is built, control lifecycle stages are run on every control in the tree before the portal can be fully-rendered. The stages of the lifecycle include but are not limited to, init, load, loadState/handlePostback, raiseChangeEvents, preRender, saveState, render and destroy as shown in FIG. 2. The control lifecycle will skip loadState/handlePostback, and raiseChangeEvents stages for a new request but runs them for a post back request that has been served. The preRender and render stages are skipped for non-visible controls. The stages can be called on each control in a depth-first order, i.e., all initialization methods such as init( ) are invoked followed by state loading method such as loadState( ) and the lifecycle may proceed in an order determined by the position of each control in the portal's meta control tree. For a non-limiting example, the exemplary control tree illustrated in FIG. 3 depicts the taxonomy of a simple portal comprised of a book (B1) containing two pages (P1 and P2), which each contain two portlets (p1-p4) and p2 also contains its own subordinate book, page, and portlet hierarchy. When this portal is rendered, the initialization method will be called first for each control in the order of: B1, P1, p1, p2, B2, P3, p5, p6, P2, p3, and finally p4. Next, the state loading method would be called in the same order, and all lifecycle methods through state save will be called eventually.

One of the most significant impediments to portal performance lies with the number of controls (resources) on a portal, wherein the controls can include but are not limited to, desktops, books, pages, and portlets. Portal consumes CPU time mainly to create a new control tree, to run control lifecycle stages, and garbage collection of control tree objects that are discarded after serving a request. Such overhead of processing time can grow exponentially for a typical portal having thousands of controls as the portal's throughput (pages/sec) is inversely proportional to the size of a portal i.e. number of books, pages, and portlets. Consequently, the larger the size of the portal's control tree, the greater the hit will be on portal performance. As large portals are being built, performance and scalability of the portal needs to be improved.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Control Tree Optimization

Various embodiments of the present invention enables the optimization of a control tree by rendering it in a way that creates the least amount of system overhead while providing a user with as complete a set of portal controls as that user will need to successfully use the portal instance. More specifically, when the portal receives a request from the user, only a partial control tree for those active controls will be built, which is a minimal and sufficient tree to render the portal while all other controls in the portal will be ignored from the tree construction. With such an approach, a significant amount of processing overhead is eliminated when the control tree is optimized since controls that are not active in the current portal instance are not built and thus far fewer controls need to be built, resulting in greatly improved performance and time.

Figure 1:
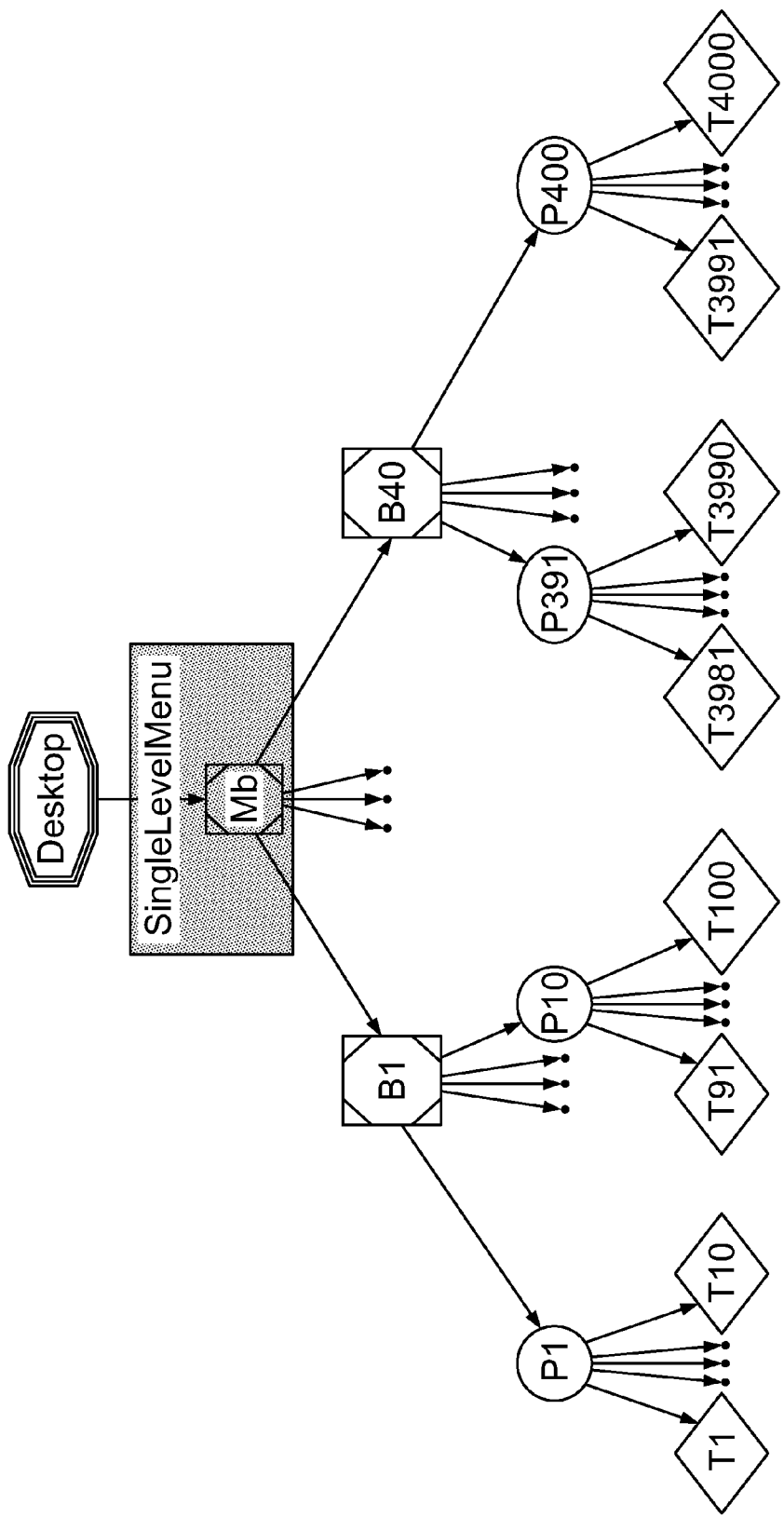
FIG. 1 is an illustration of an exemplary control tree of a portal.
Figure 2:
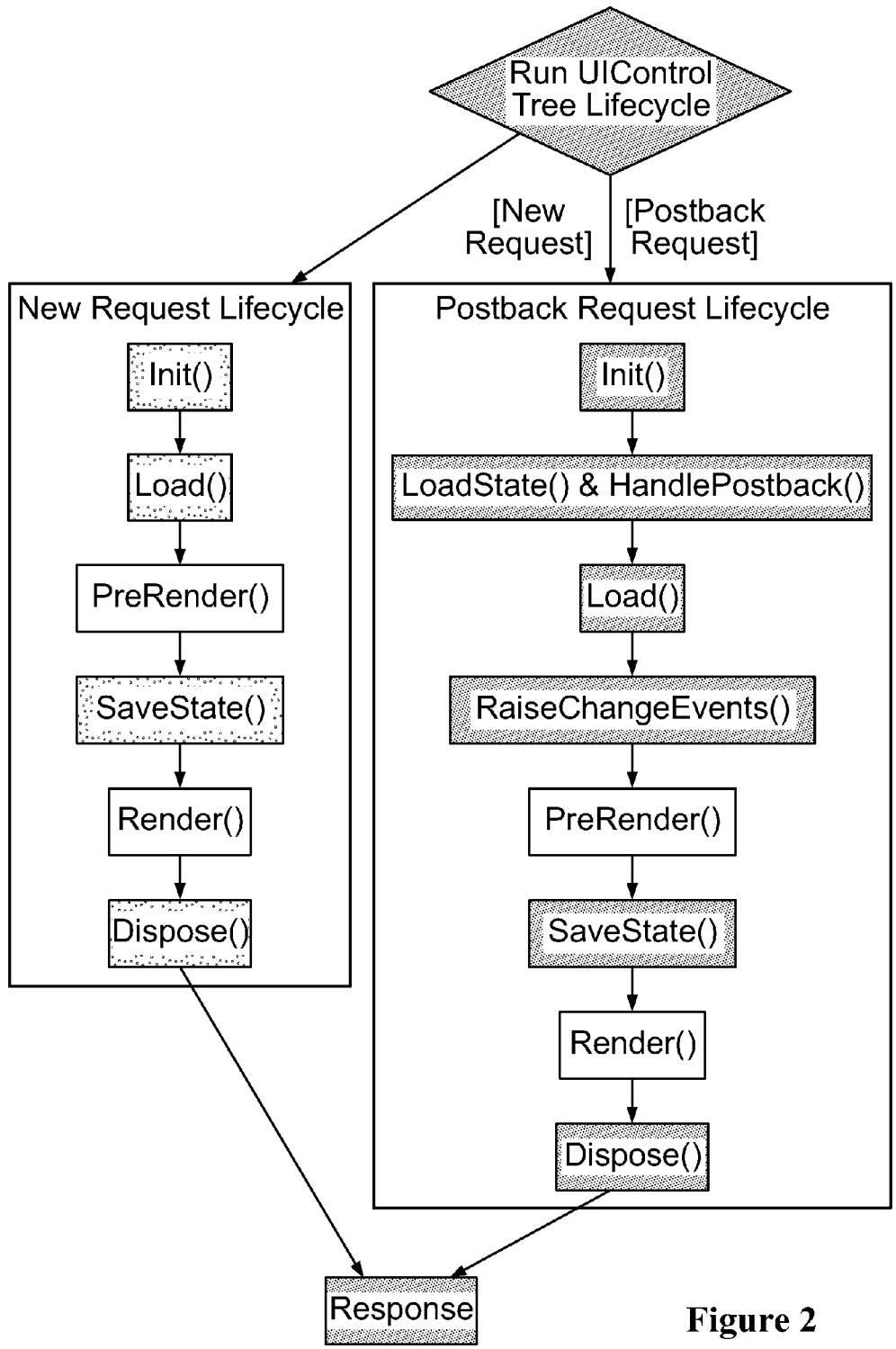
FIG. 2 shows stages in a control lifecycle.
Figure 3:
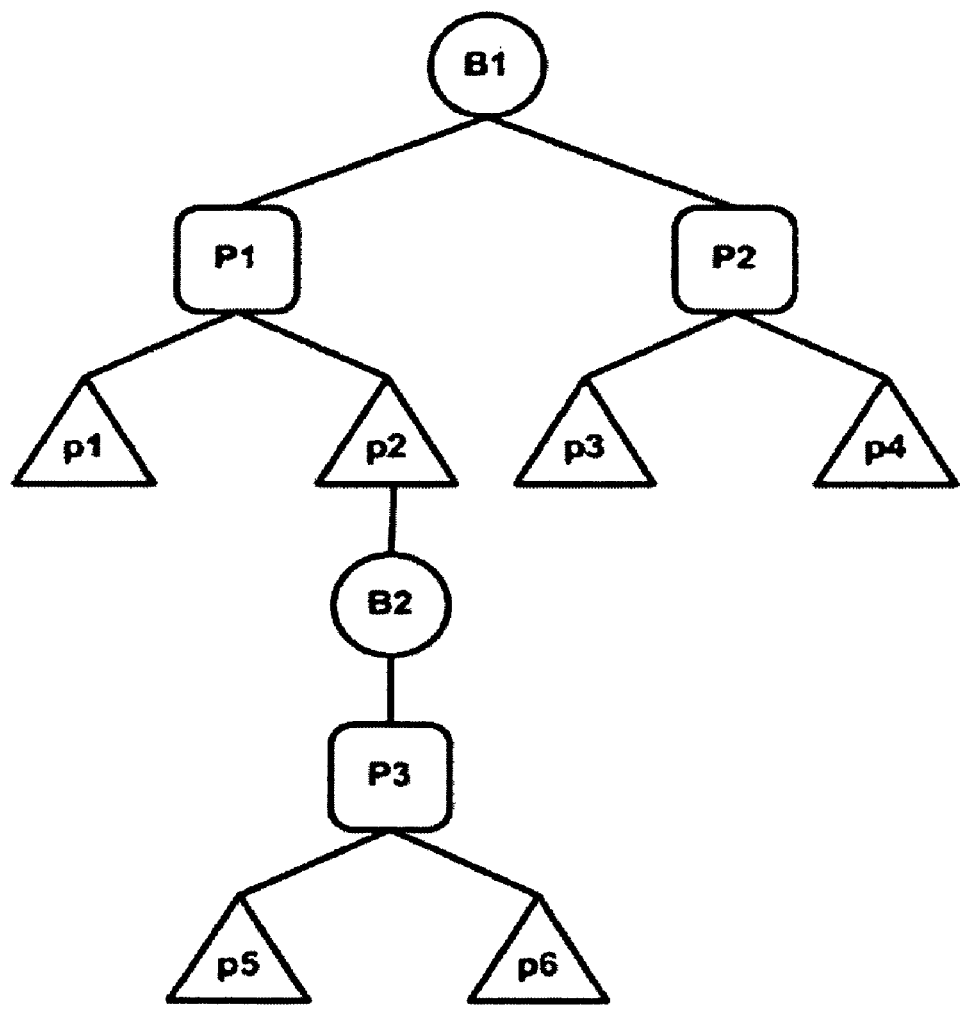
FIG. 3 is an illustration of another exemplary control tree of a simple portal.
Figure 4:
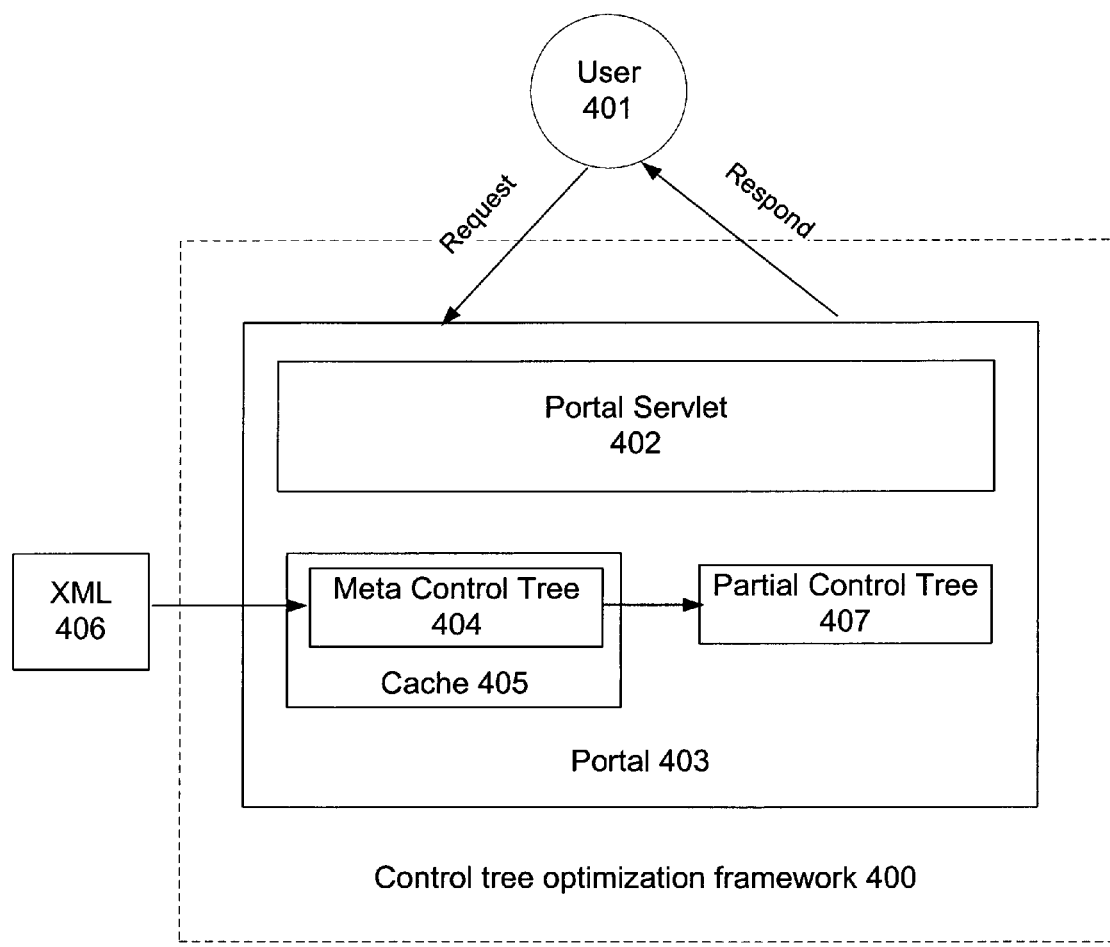
FIG. 4 is an illustration of an exemplary framework for control tree optimization in one embodiment of the present invention.

FIG. 4 is an illustration of an exemplary framework 400 for control tree optimization in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 4, a portal managing component such as a portal servlet 402 is operable to render pages of a portal 403 upon a request from a user 401. As discussed earlier, the controls on the portal can be organized as a meta control tree 404 in a cache 405, wherein the meta tree can be created from an XML markup file 406 of the portal. Upon user's request, a partial instead of a complete control tree 407 containing only active controls in the portal can be created based on the meta control tree. This partial control tree can render the pages of the portal to the user once run through stages of a control lifecycle on the control tree.

Figure 5:
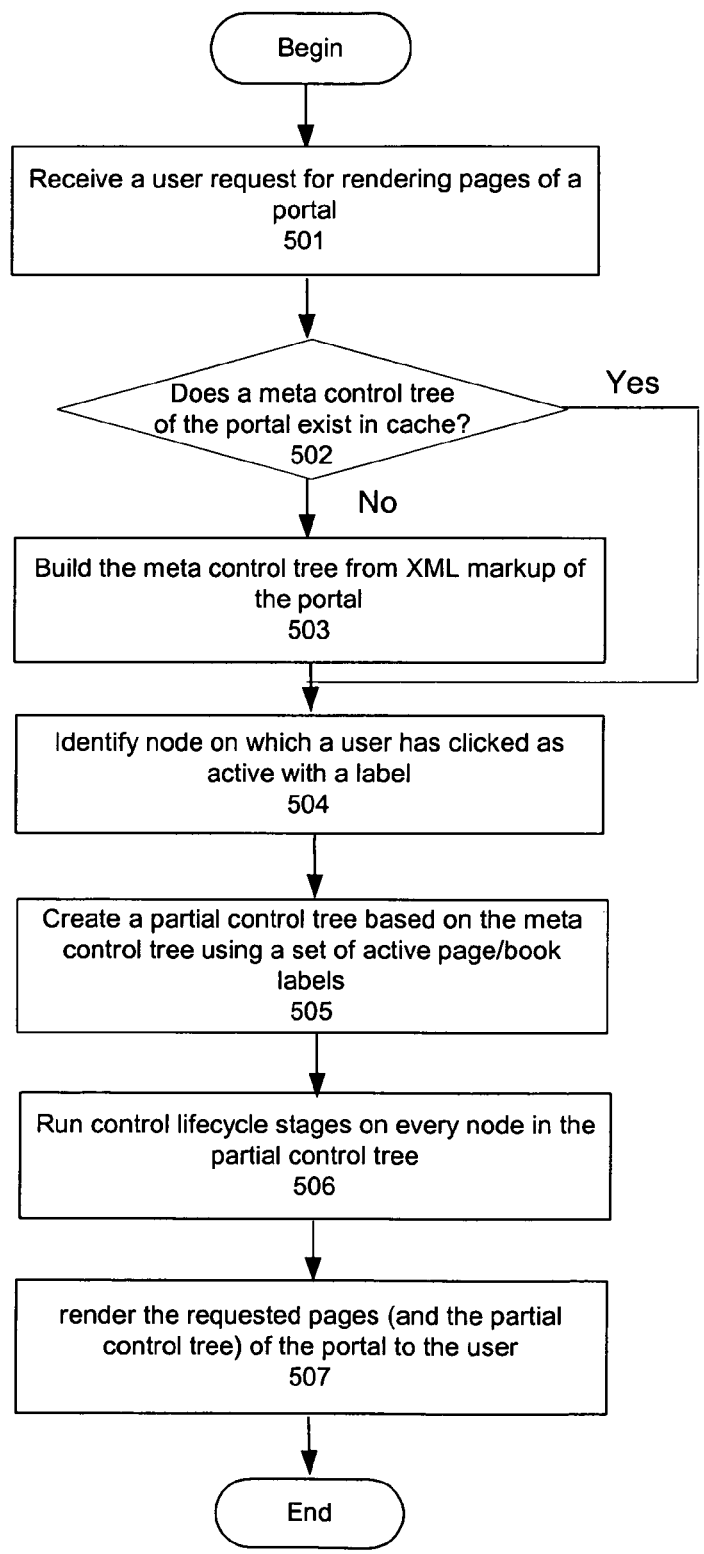
FIG. 5 is an exemplary flowchart for control tree optimization in one embodiment of the present invention.

FIG. 5 is an exemplary flowchart for control tree optimization in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 5, the portal servlet receives a user request (for a non-limiting example, via a mouse-click) for rendering the portal at step 501. It will read from the cache to determine if a meta control tree exists in cache at step 502. If the meta control tree does not exist, one will be built at step 503 from XML markup of the portal. Per each user request, node on which a user has clicked can be identified as active with a label at step 504, and a partial, not necessarily complete, control tree can be created based on the meta control tree using a set of active page/book labels at step 505. Every node (control) in the partial control tree will then run through control lifecycle stages at step 506 and render the requested pages (and the partial control tree) of the portal to the user at step 507.

Figure 6:
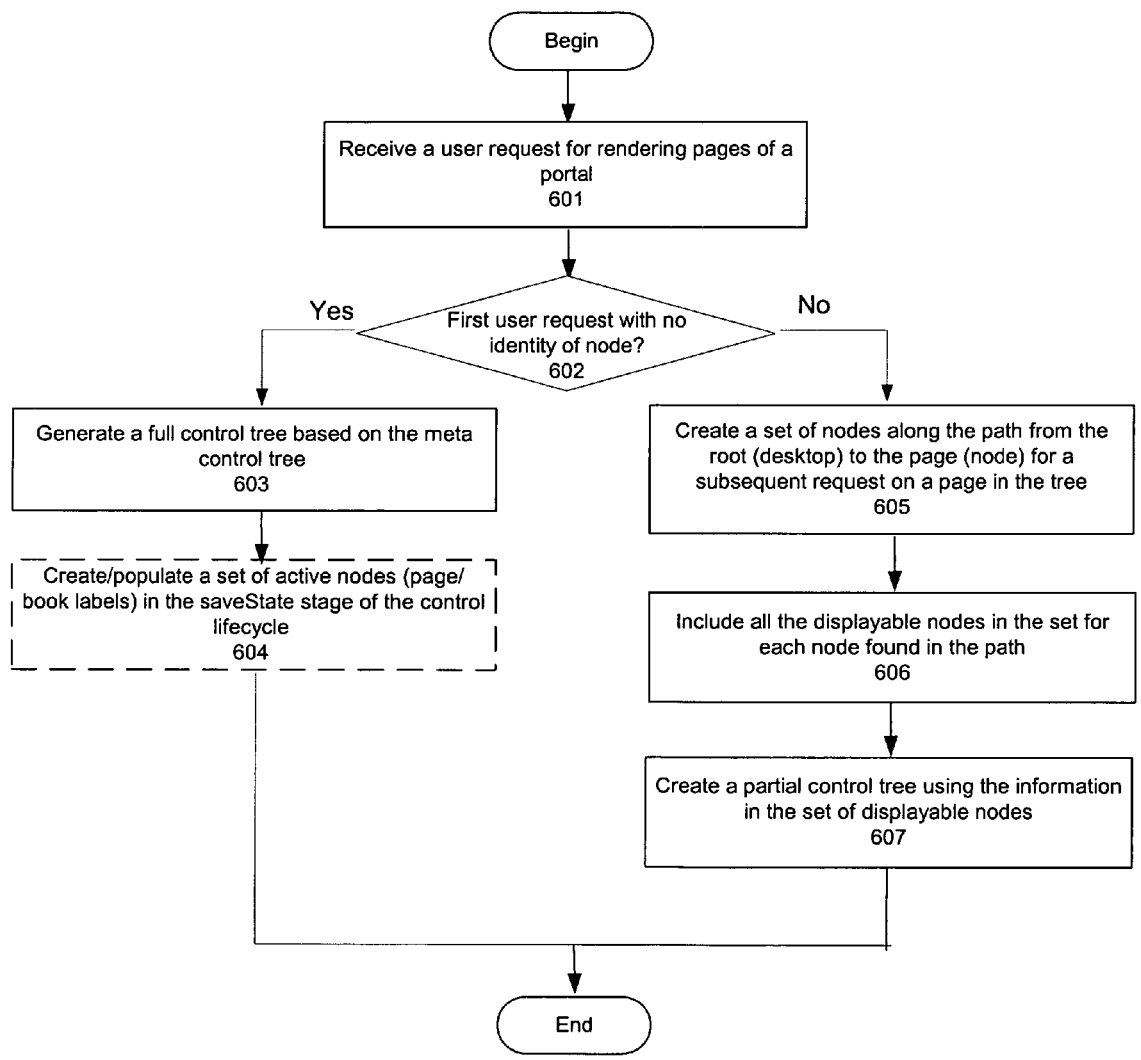
FIG. 6 is an exemplary flowchart illustrating partial control tree creation in one embodiment of the present invention.

FIG. 6 is an exemplary flowchart further illustrating the partial control tree creation in one embodiment of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 6, a user request for rendering pages on the portal is received at step 601. If it is the first user request with no identity of a node in it at step 602, a full control tree is generated based on the meta control tree at step 603. Optionally, a set of active nodes (page/book labels) can be created/populated in, for example, the saveState stage of the control lifecycle at step 604. For a subsequent request on a page in the tree, a set of nodes along the path from the root (desktop) to the page (node) can be created at step 605, and all the displayable nodes for each node found in the path can also be included in the set at step 606. Finally, a partial control tree is created using the information in the set of displayable nodes at step 607.

Figure 7:
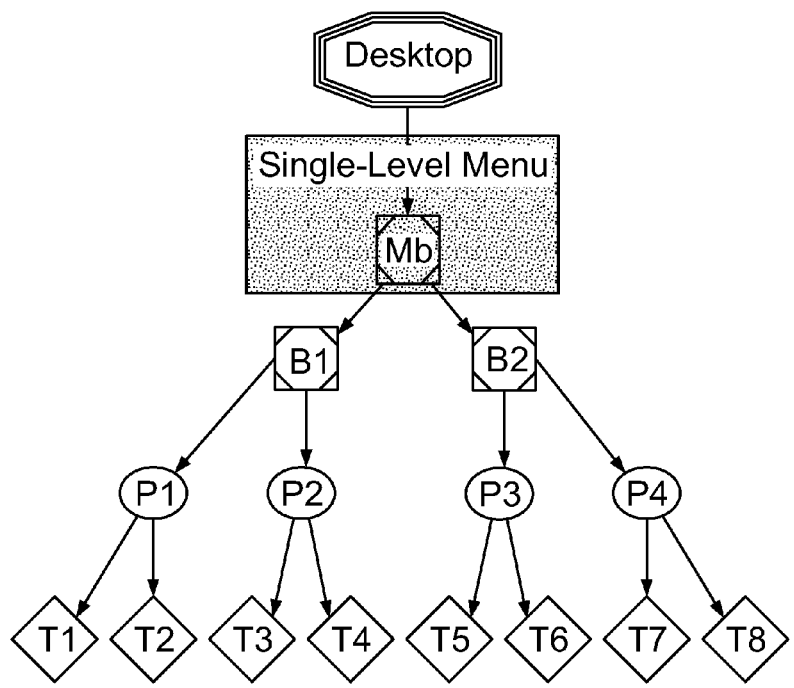
FIG. 7(a)-(g) illustrate the creation of the partial control tree in accordance with embodiments of the present invention when the main book uses the standard single-level menu.
Figure 7:
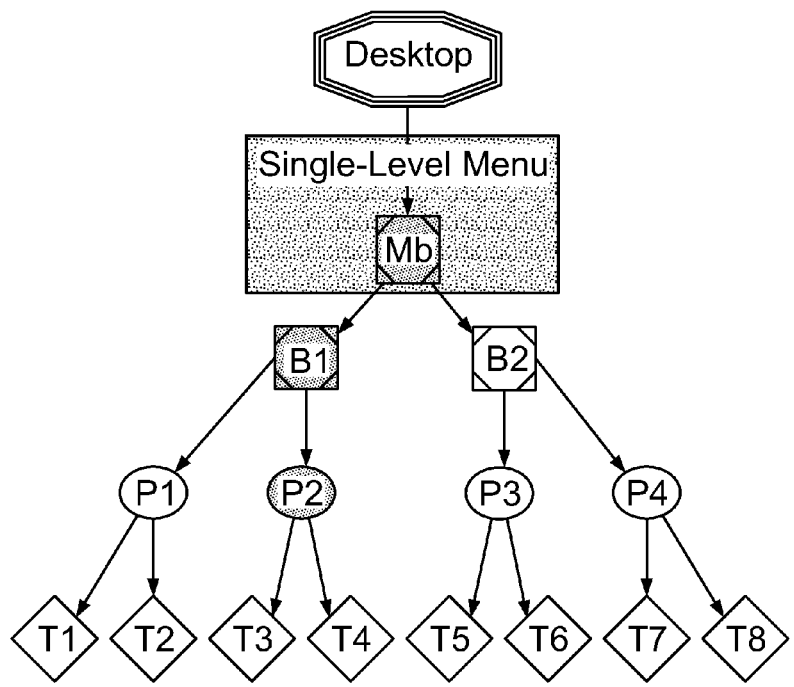
Figure 7:
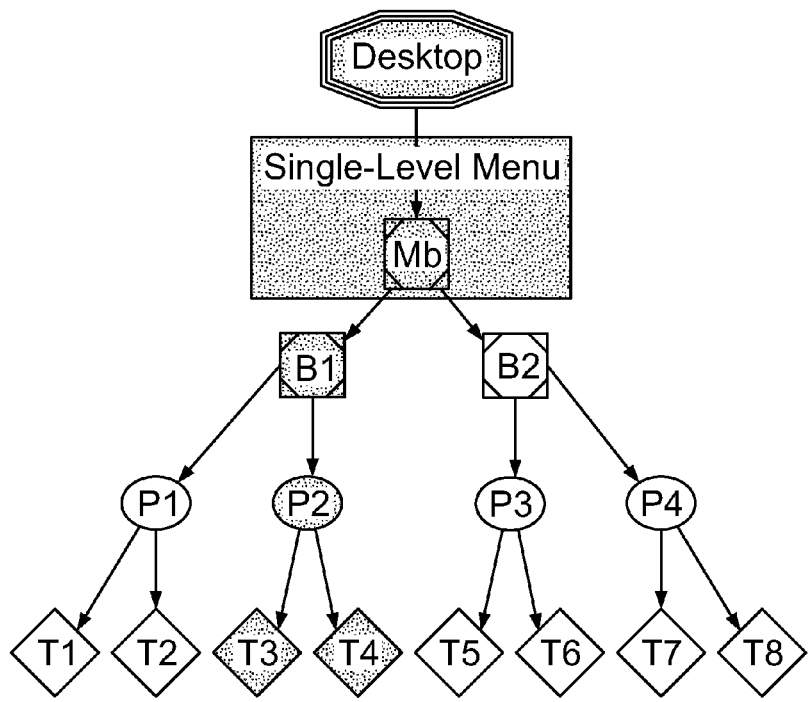
Figure 7:
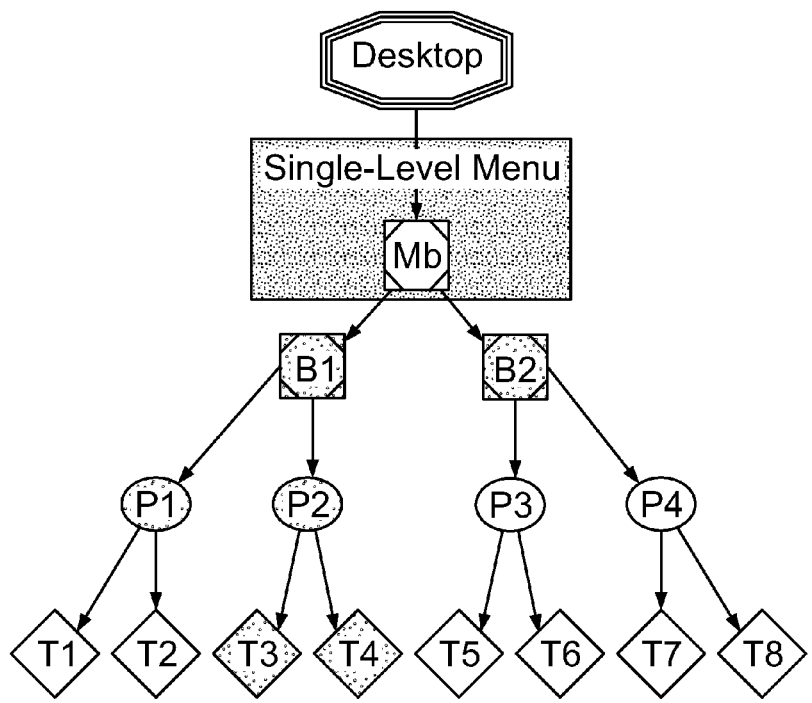
Figure 7:
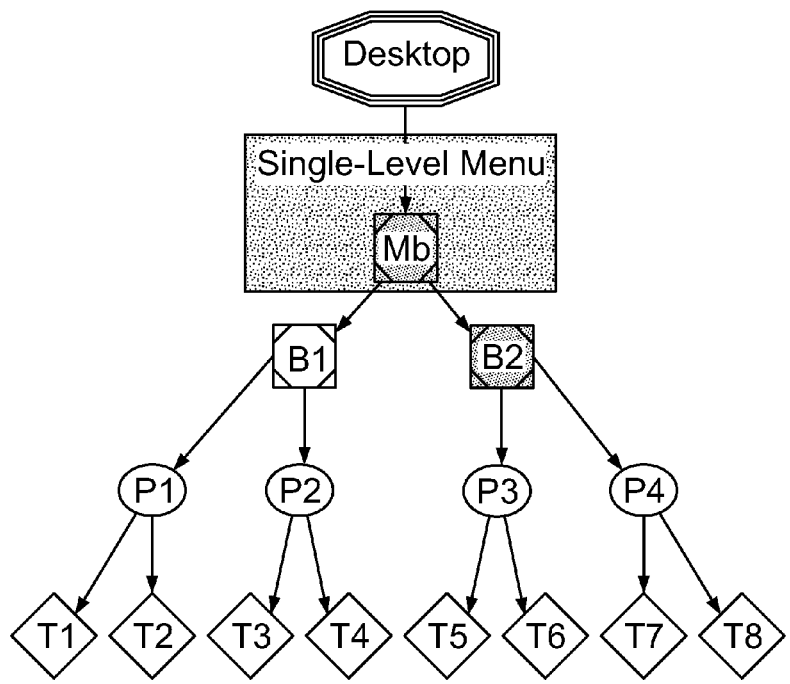
Figure 7:
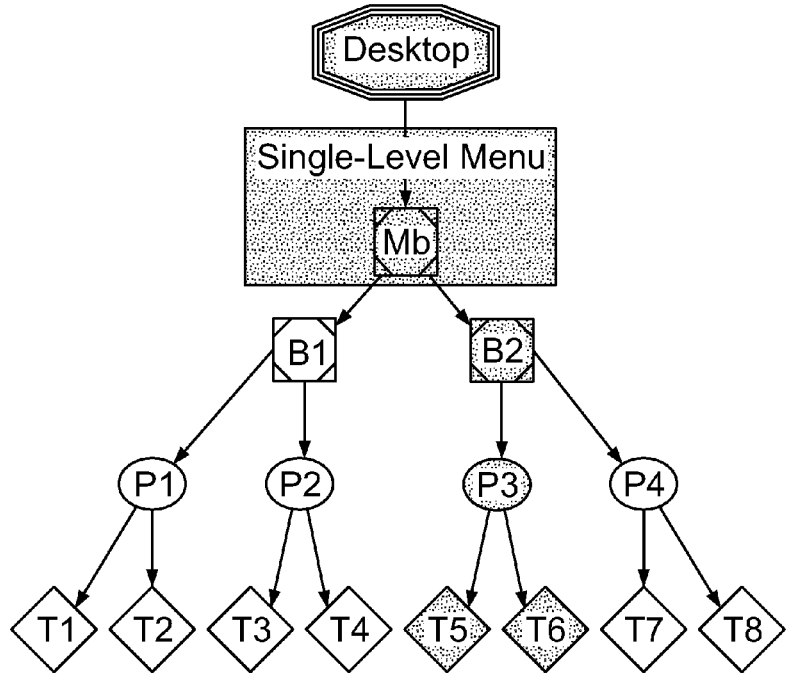
Figure 7:
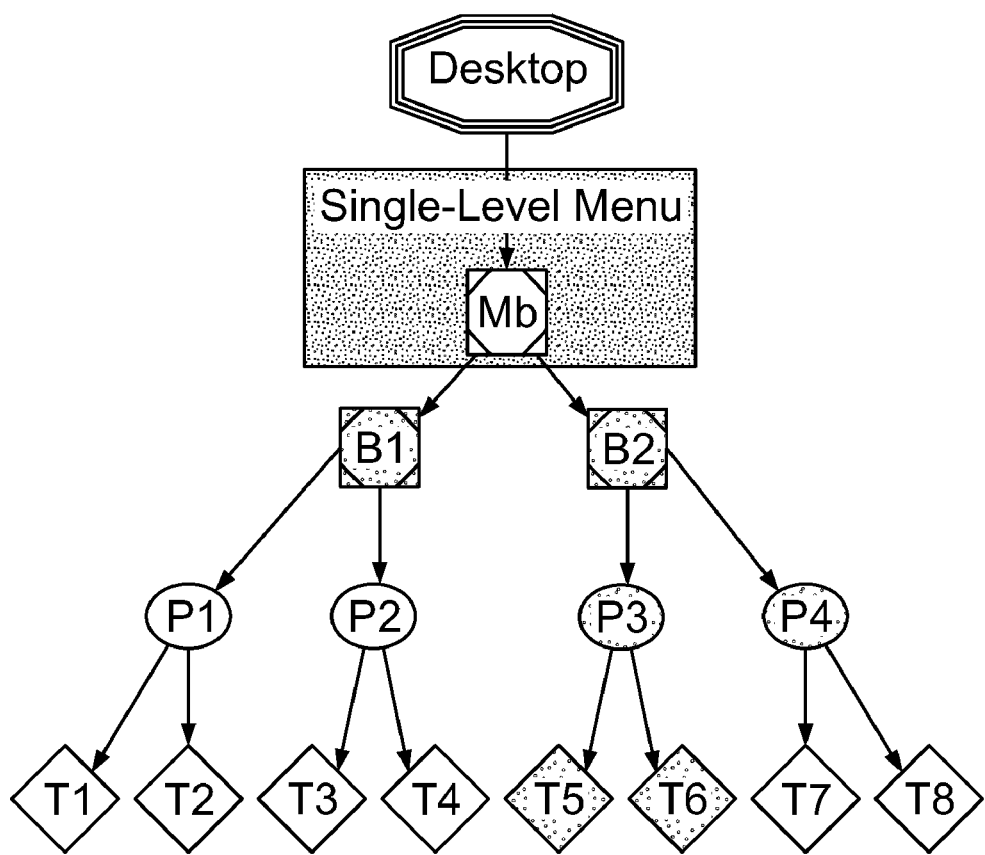

FIG. 7(a)-(g) illustrate the creation of the partial control tree in accordance with embodiments of the present invention when the main book uses the standard single-level menu. Specifically, FIG. 7(a)-7(d) illustrate partial control tree creation when a user clicks on page P2, i.e., node's identity is P2. FIG. 7(a) is an exemplary meta control tree representation for a simple desktop with single level menu, where Mb is the main book, Bn is nth sub Book, Pn is nth page and Tn is nth portlet. The menu type used in the main book Mb is the standard single-level menu. The pages P1 and P3 are considered to be default pages of B1 and B2 respectively. A full control tree will be created upon the first request when page label is null, i.e., the set of active page/book labels is empty. During the processing of first request, the active set of page/book labels are computed in the saveState stage of the lifecycle, the set contains $S_A=\{B1, P1, P3\}$. If PL is a book's label, the method uses SA to identify active page of the book.

Upon the subsequent post back request for page P2 (as a non-limiting example), the inputs to the method are page label PL=P2 and the active set of page/book labels $S_A=\{B1, P1, P3\}$. First, the method returns path information with a list of pages found in the path [P2], and a set $S_D=\{Mb, B1, P2\}$, as highlighted in FIG. 7(b). Next, the method includes all the displayable nodes for each page found in the path information. There is one page P2, two portlets of it are included into the set $S_D$. The node set $S_D$ now contains {Mb, B1, P2, T3, T4} as shown in the FIG. 7(c). Finally, the method creates a partial control tree using the information in the set of displayable nodes i.e. $S_D$={Mb, B1, P2, T3, T4}, which contains the highlighted nodes in the FIG. 7(d). The book node B2 is included as main book Mb uses single-level menu and a tab needs to be displayed for the book B2, but its children are not included as they are non-visible for this request.

Continuing the interaction with the portal, FIGS. 7(e)-7(g) illustrate partial control tree creation when a user clicks on book B2 i.e., node's identity is B2, wherein the set of previously active page/book labels is needed for the partial control tree computation. The method starts with inputs page label PL=B2 and the set of previously active page/book labels $S_A$={B1, P2, P3}. It first returns path information for node B2 with an empty list of pages in the path to node B2 and a set of nodes {Mb, B2} as highlighted in FIG. 7(e). Next, the method uses set $S_A$ to find which page was previously active when processing the children of book B2. The page P3 was active in the previous request (it is the default page of the book B2) and is now displayable, so its children are included. Now the displayable node set $S_D$ contains {Mb, B2, P3, T5, T6} as shown in FIG. 7(f). Finally, the method creates a partial control tree using the displayable node set $S_D$. This partial control tree contains nodes {Mb, B1, B2, P3, T5, T6, P4} as shown in FIG. 7(g).

In some embodiments, If multi-level menu is used by the portal, there will be a trade-off between the benefit of using such menu by the portal and the performance hit it encounters. On one hand, if a multi-level menu is on an active book, every control accessible from that menu must be created before the portal is completely rendered, resulting in more overhead and a greater performance hit. On the other hand, because a multilevel menu results in the creation of a skeletal control tree, it can reduce the number of cycles required to navigate to the destination desired by the user, thus reducing the total overhead required to accomplish a navigation.

Figure 8:
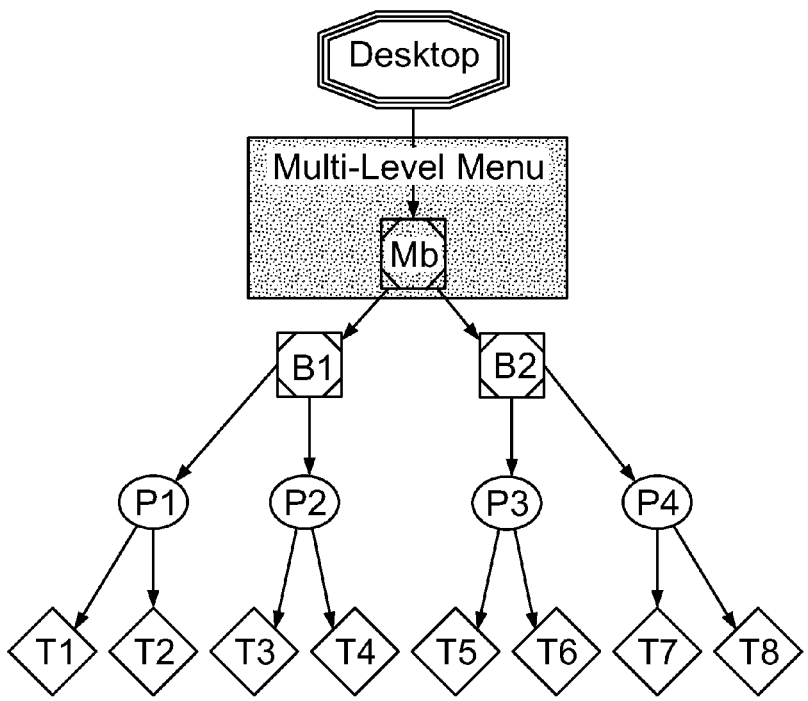
FIG. 8(a)-(d) illustrate the creation of the partial control tree in accordance with embodiments of the present invention when the main book uses the standard multi-level menu.
Figure 8:
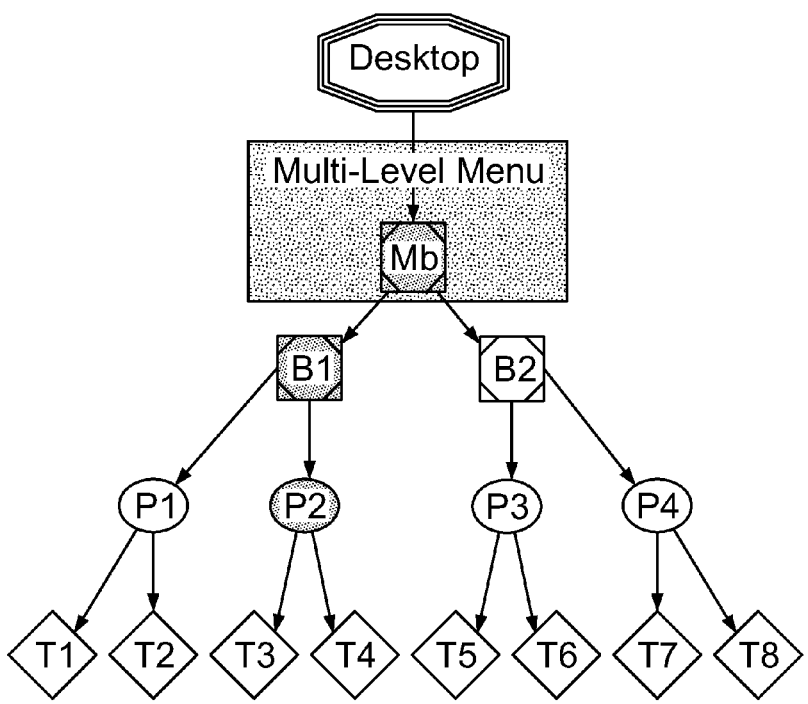
Figure 8:
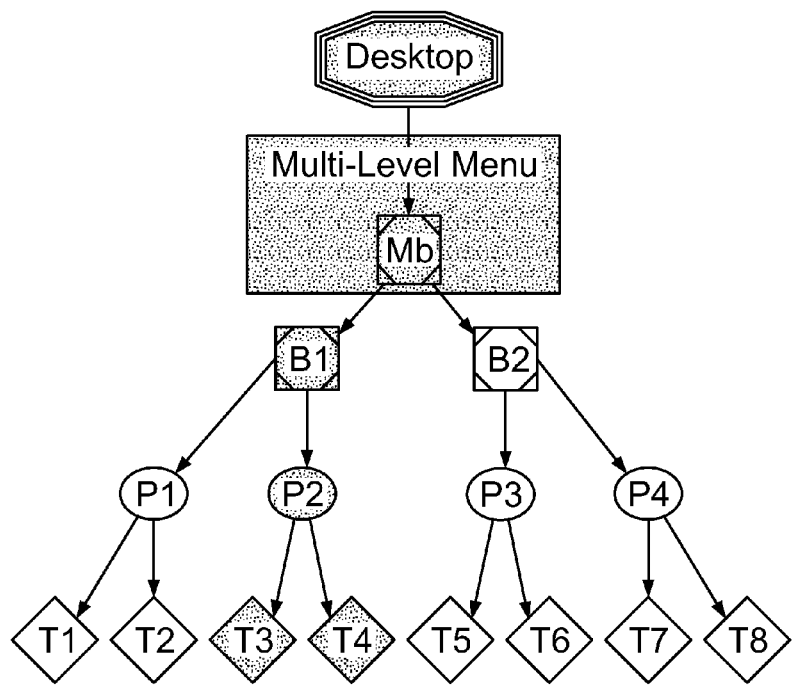
Figure 8:
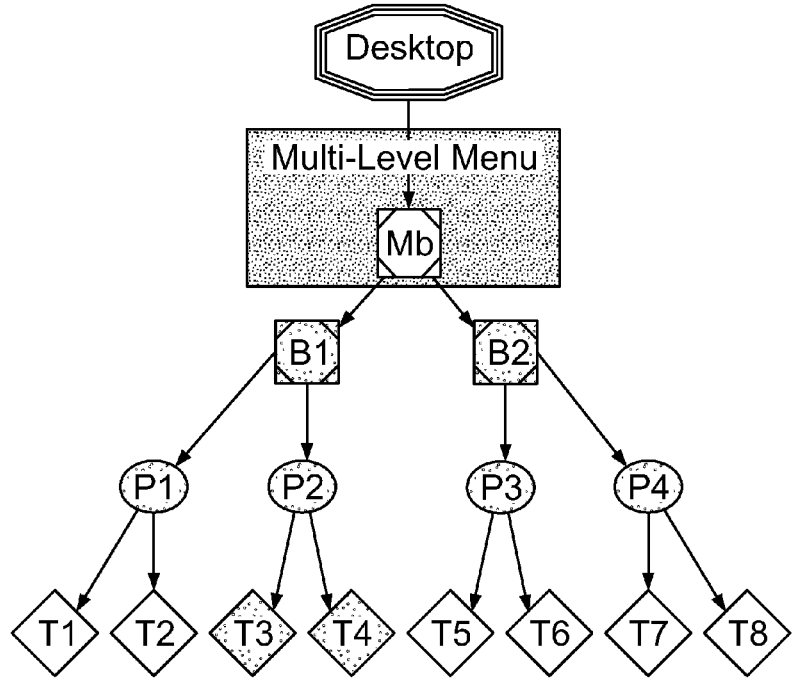

FIG. 8(a)-(d) illustrate the creation of the partial control tree in accordance with embodiments of the present invention when the main book uses the standard multi-level menu. FIG. 8(a) is an exemplary meta control tree representation for a simple desktop with multi-level menu. The partial tree for a book with multi-level menu includes its books and pages so that it can create book menu and sub-menus. When pointed at book B1 or B2, a menu will appear dynamically showing pages P1 and P2 as menu items for the book B1 and pages P3 and P4 as menu items for the B2. The inputs to the partial control tree method are same as in the prior example, i.e. the page label P2 and a set of previously active page/book labels i.e. $S_A$={B1, P1, P3}.

The partial control tree method first returns a list of pages containing [P2] and a set of {Mb, B1, P2} for page label P2 as highlighted in FIG. 8(b). Next, the method includes all the displayable nodes for each page found in the path information. The two portlets of page P2 are included into the set $S_D$. The node set $S_D$ now contains {Mb, B1, P2, T3, T4} as shown in FIG. 8(c). Finally, the method creates a partial control tree using the information in the set of displayable nodes, $S_D$={Mb, B1, P2, T3, T4} as shown in FIG. 8(d). The number of nodes in the partial control tree created when a book uses multi-level menu, is always higher than when a book uses single-level menu.

Figure 9:
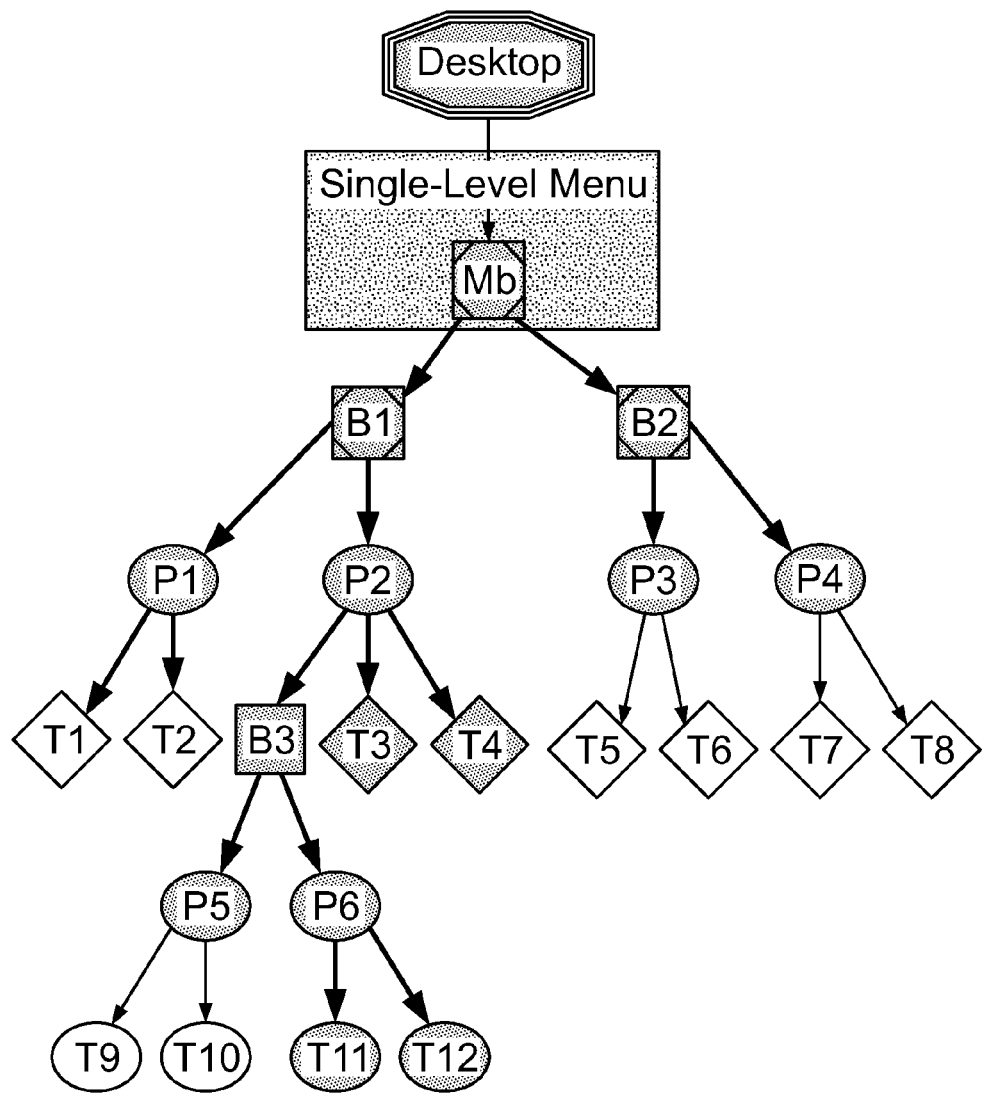
FIG. 9 shows an exemplary partial tree when a shadow tree is created in accordance with embodiments of the present invention.

In some embodiments, the control tree optimization can detect that the main book has a multi-level menu and creates a shallow tree for the book B2 (only including pages P3 and P4 without including their children) and including all the children of the page P2, which are present in the set $S_D$. Here, the shallow tree is a partial tree that contains all the books and pages and the children of displayable pages. The control tree optimization creates a shallow tree when only page label is passed as input to it and it also creates a shallow tree for a book if it has a multi-level menu. FIG. 9 shows an exemplary partial tree created when only the page label P6 is passed to it without passing the set of previously active page/book labels $S_A$. The reason to create a shallow tree when only page label is passed as input is to compute correct set of active page/book labels $S_A$ so that the correct partial trees are created for the future requests. If the set of previously active page/book labels is inconsistent, the tree optimization algorithm may not recognize some nodes as displayable and ignore to include them in partial trees.

Control Tree State Management

Controls representing a portal or a desktop are stateful controls that maintain their states for the duration of user's session. For a non-limiting example, portlets maintain as part of their states, modes such as edit/help, status such as maximized, minimized, and normal. Once the control tree is created upon a user request and optimized, the states of all stateful controls in the control tree are also created and maintained for the control tree. The state of the control tree (i.e., the states of the controls in the control tree) can be maintained in, for non-limiting examples, cookie, URL and user's session object. The default state location is session and can be changed via a configuration file, which can be in XML format. The management for each state location can be implemented by a pair of reader and writer, which can implement control state reader/writer interfaces and register in an XML configuration file. The scalability of the control tree state management and optimization for "session" state location is an important factor for portal performance.

Traditionally, the conservative approach to control tree state management can be implemented using the following approach via a session state reader and writer pair with the state location set to "conservative-session" value in the configuration file:

1. The state reader loads the states of controls during the Load State stage of the lifecycle.
2. The state writer clears previous states of the controls at the beginning of the Save State stage of the lifecycle.
3. The state writer then saves the states of all the stateful controls during the Save State stage of the lifecycle.

Figure 10:
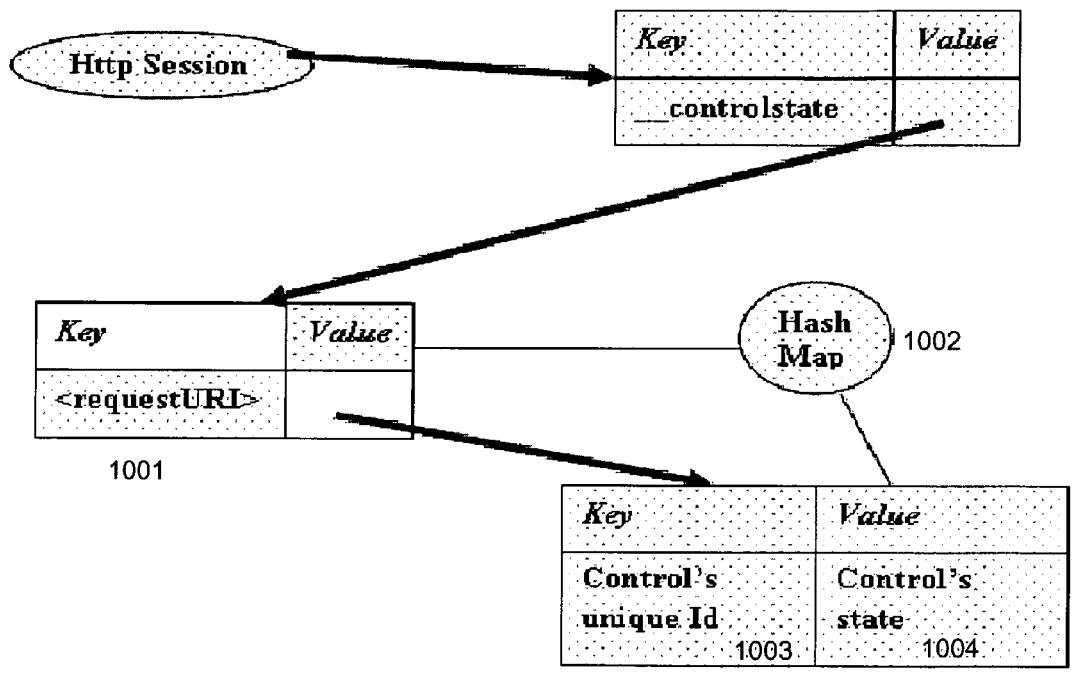
FIG. 10 is an illustration of an exemplary layout used by the conservative control tree state management approach.

FIG. 10 shows an exemplary layout used by the conservative approach, wherein the state 1004 of a control 1003 may be saved and later retrieved via a hash map 1002 upon every request 1001 from the user. Since the state of the control tree is cleared at the beginning of the Save State lifecycle, it has to be recreated for all controls upon the user's request. As the result, the footprint of control tree's state depends on the size of the portal and the state of entire control tree will be replicated when session state location is used in a cluster. Consequently, the throughput (measured by pages/sec) starts to go down as the number of concurrent users increases.

Various embodiments of the present invention enables the scalable control tree state management/optimization to overcome the above mentioned limitations using the following method, also via a session state reader and writer pair with session state location configured.

1. The state reader loads the state of a stateful control if it is available in the Load State stage of the lifecycle.
2. The state writer does not clear the previous state of the control.

3. The state writer saves the current state of the control only if it has changed from its initial state.

Figure 11:
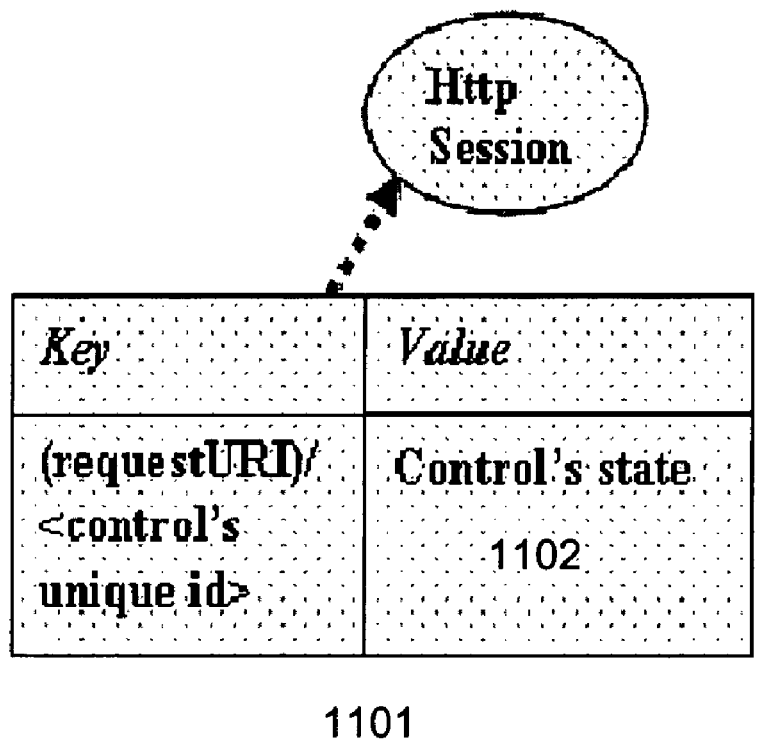
FIG. 11 is an illustration of an exemplary layout used by the scalable control tree state management approach in one embodiment of the present invention.

FIG. 11 shows an exemplary layout used by the scalable approach that can manage the controls' state efficiently. The stateful controls 1101 are modified to store or mark their initial state, and distinct from the conservative approach, the session state writer compares the control's initial state with its current state and saves its state only if it is different from initial state. Plus, the control tree's state 1102 is not cleared upon every request and it is directly written to a session instead of writing in to intermediate hash maps. When the initial request from the user is received, there will be no control tree's state stored (unless the page contains portlets, for non-limiting examples, page flow and web flow portlets, that compute their own state in a pre-Render life cycle). With such an approach, only minimal states, for example, one or two states of a control will be replicated in a cluster as opposed to the state of the entire tree under the conservative approach. Plus, the control tree's state grows in accordance with the user's interaction with a portal/desktop, wherein such interaction may include but is not limited to, user navigating to different pages, maximizing/minimizing a portlet, etc.

In some embodiments, the size of the control tree state can be reduced by removing a control's state when it's current state is equal to its default state in order to avoid the control tree's state growing according to user's interaction with a portal/desktop but never shrinking (even if there are opportunities). When a stateful control comes back to its default state, its current state will be deleted from the state location i.e., from session, cookie or URL. Under such an approach, the scalable control tree state management/optimization method can be further revised to compare a control's current state to its default state:

1. The state reader loads the state of a stateful control if it is available in the Load State lifecycle stage.
2. The state writer does not clear the previous state of the control
3. The state writer saves the state of the control only if its initial state is not equal to its current state.
4. The state writer removes the state of the control if its current state is equal to its default state.

Control Tree Compression

A user may be allowed to customize its portal by adding/removing controls (portlets/books/pages) in the portal depending on its entitlements defined by a portal administrator. Different meta control trees may be created and cached for different user customizations. The meta control tree for the default portal can also be cached to serve the user without customization.

Figure 12:
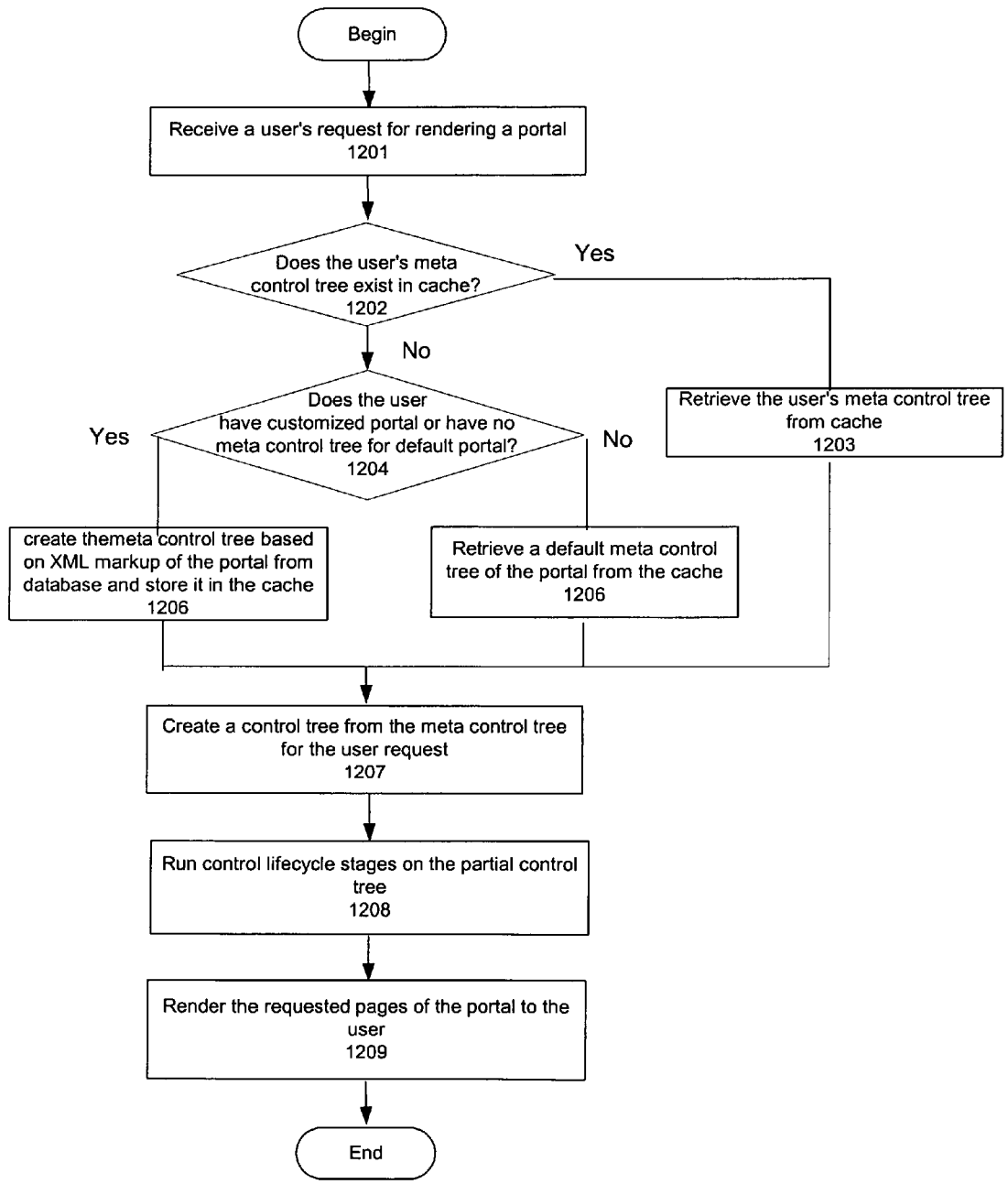
FIG. 12 is an exemplary control flow for serving a portal request from a user for a customized portal.

FIG. 12 is an exemplary control flow for serving a portal request from a user for a customized portal. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 12, the portal servlet receives a user's request for rendering the portal at step 1201. It will retrieve the user's meta control tree at step 1203 if it exists in cache at step 1202. If the meta control tree does not exist, it will further check if the user has customized portal at step 1204. If the user has not customized the portal and a meta control tree of the default portal exists in cache, it will be retrieved from the cache at step 1205. The default meta control tree may also be used to serve all anonymous users. If the portal has been customized or the meta control tree for the default portal does not exist in cache, the meta control tree will be constructed based on XML markup of the portal from database and such meta control tree will be stored in the cache at step 1206. Once the meta control tree is available, A control tree can be created at step 1207 from the meta control tree for the user request, which cannot be reused to serve subsequent requests since it is state full. The control tree will then run through control lifecycle stages at step 1208 the requested pages of the portal will be rendered to the user at step 1209.

Figure 13:
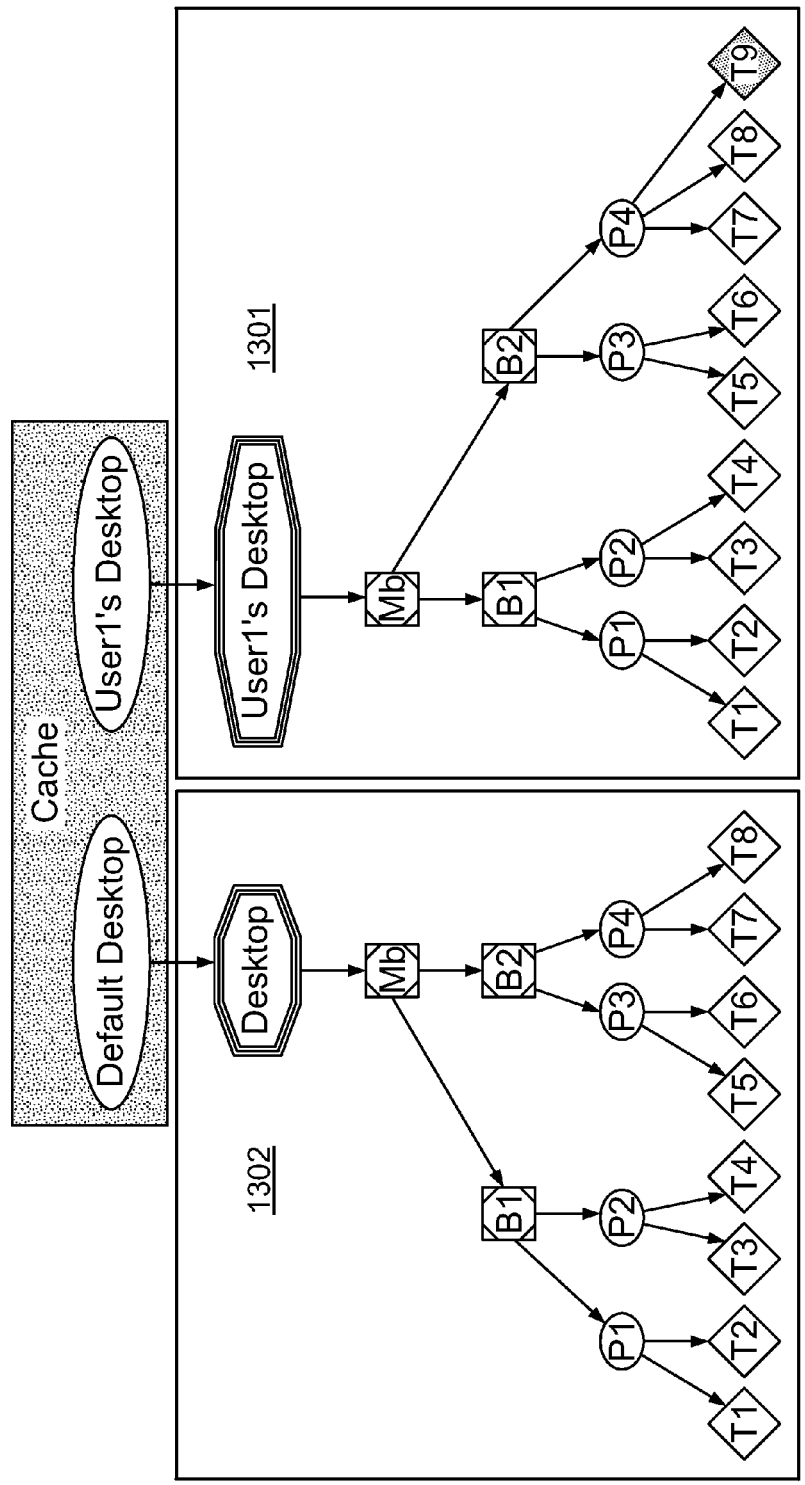
FIG. 13 is an exemplary customization of the default portal by adding or removing portlets, pages, and books in the portal.

A user may customize the default portal by adding or removing portlets, pages, and books in the portal as shown in FIG. 13. User1 customized the default portal by adding the portlet T9 to the page P4 and the portal servlet creates a different meta control tree 1301 for user1 when serving its portal requests. The portal requests from user1 are served using user1's meta control tree, while requests from anonymous users and users with no customizations are served using default meta control tree 1302.

The customized meta control trees are removed from cache only when corresponding users sessions expire or when users logout. When a large number of users concurrently access customized portals, significant amount of memory will be consumed to cache the customized meta control trees for the duration of the corresponding users' session. Such high memory consumption affects overall portal performance and scalability characteristics as CPU time is spent in garbage collections and fewer concurrent users will be served.

Various embodiments of the present invention enables control tree compression, which is designed and implemented to compress multiple meta control trees when they are created to conserve memory. More specifically, a sub-tree cache where all nodes of a meta control tree can be cached is maintained, and multiple meta control trees can be compressed by sharing sub trees that are used by all of them to reduce memory usage. Such control tree compression approach works on the fact that users generally customize only few resources of a default portal and rest of the portal's resources can be shared among the users' customized portals and the default portal. As a result of compressing multiple meta control trees that differ in only few nodes, the overall memory usage of the meta control tree cache can be reduced.

Figure 14:
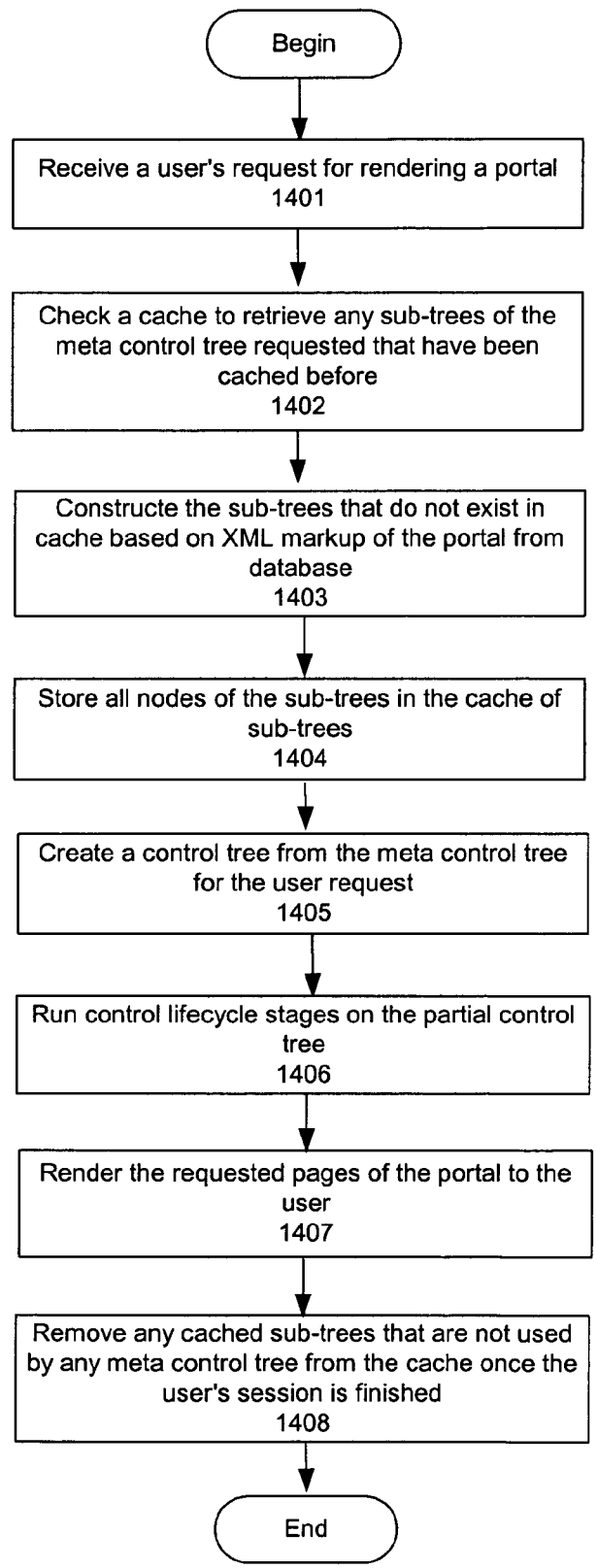
FIG. 14 is an exemplary control flow for control tree compression in accordance with embodiments of the present invention.

FIG. 14 is an exemplary control flow for control tree compression in accordance with embodiments of the present invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 14, the portal servlet receives a user's request for rendering the portal at step 1401. It will then check a cache to retrieve any sub-trees of the meta control tree requested that have been cached before at step 1402. For the sub-trees that do not exist in cache, they will be constructed at step 1403 based on XML markup of the portal from database and all nodes of the sub-trees will be stored in the cache of sub-trees at step 1404. Once the entire meta control tree is available, A control tree can be created at step 1405 from the meta control tree for the user request. The control tree will then run through control lifecycle stages at step 1406 and requested pages of the portal will be rendered to the user at step 1407. Finally, any cached sub-trees that are not used by any meta control tree will be removed from the cache at step 1408 once the session for the user's request is finished (invalidated).

Figure 15:
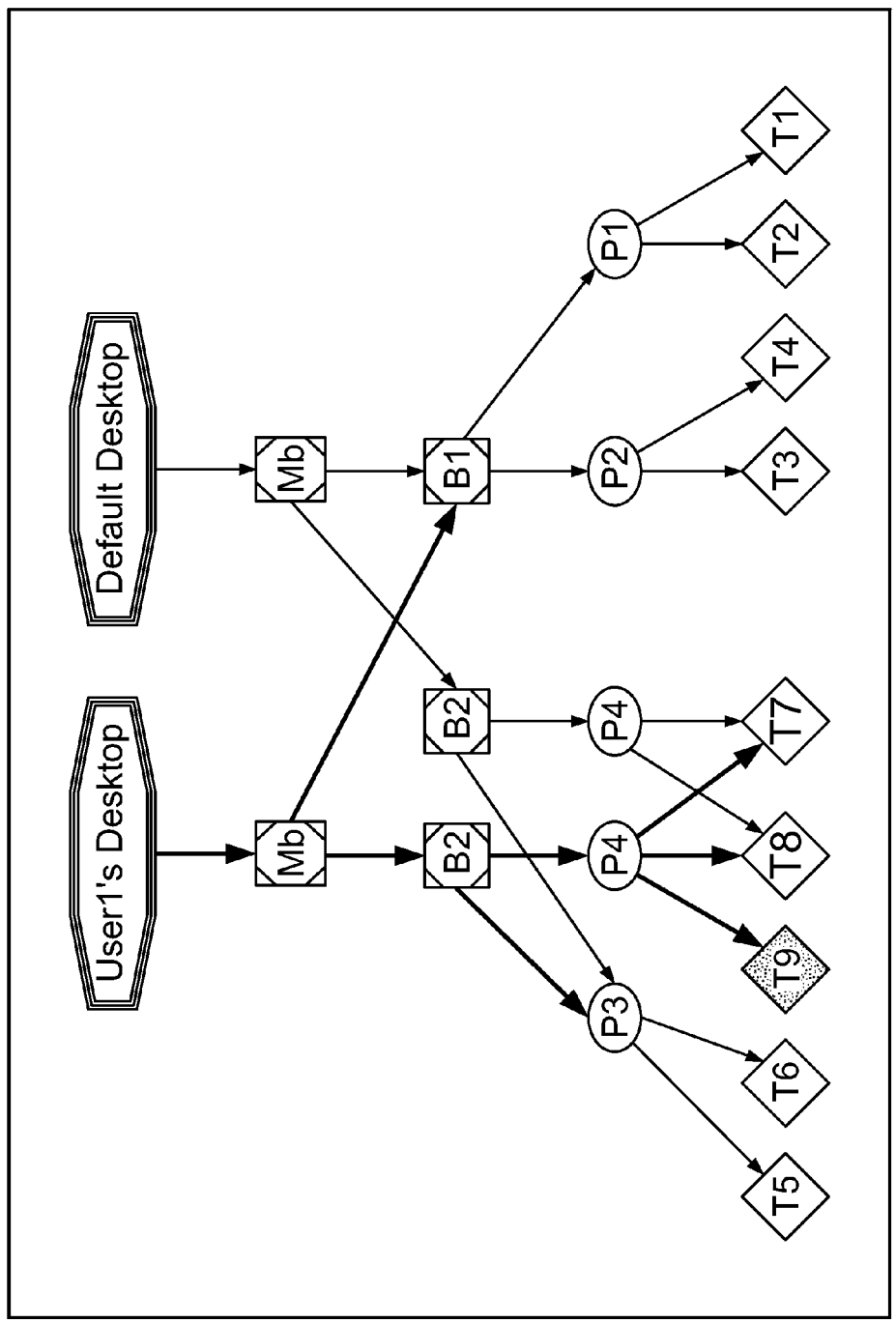
FIG. 15 shows the result of applying control tree compression to the meta control trees in FIG. 13.

FIG. 15 shows the results of applying control tree compression to the two meta control trees in FIG. 13, wherein the default meta control tree and user1's meta control tree can share book B1, pages P2, P2 and P3, and portlets T1, T2, T3, T4, T5, T6, T7, and T8. The book B2 is different as user1's book B2 contains the customized page P4 that contains the portlet T9. If portlet T9 and page P4 are only used in user1's meta control tree, they are removed from the sub-tree cache when user1 logs out or user1's session is invalidated.

In some embodiments, a node in a meta control tree can have the following class structure for the implementation of control tree compression.

```
MetaControl
{
    private Class controlClass;
    private List properties; // list of ControlProperty instances
    private List children; // list of children of type MetaControl
}
ControlProperty
{
    private String propertyName;
    private String propertyValue;
}
```

The hash function used to search for a node in the cache of sub-trees can be computed as follows Node's Hash code = (Compute hash code for *controlClass*) +

(Compute hash code for list of properties) +

(Compute hash code for list of children);

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "servlet" is used in the embodiments of the systems and methods described above, it will be evident that such concept can be interchangeably used with equivalent concepts such as, class, method, type, interface, bean, component, object model, and other suitable concepts. While the concept "control" is used in the embodiments of the systems and methods described above, it will be evident that such concept can be interchangeably used with equivalent concepts such as, resource, page, link, bean, class, method, type, component, object model, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide portal rendering, comprising:
    one or more processors;
    a portal containing a plurality of controls, wherein the portal allows a plurality of users to access a website;
    a meta control hierarchy with a plurality of nodes, the meta control hierarchy representing the plurality of controls on the portal, wherein each node in the meta control hierarchy holds information of one of the plurality of controls;
    a portal managing component, that runs on the one or more processors, operable to perform:
        allowing the plurality of users to customize the meta control hierarchy and create a plurality of customized meta control hierarchies, wherein each of the customized meta control hierarchy is associated with one user of the plurality of users;
        compressing the plurality of customized meta control hierarchies by sharing sub-hierarchies among the plurality of customized meta control hierarchies;
        accepting a user's request for rendering one or more controls in the portal, wherein the one or more controls is associated with a selected node and the user is one of the plurality of users;
        creating a partial control hierarchy based on a customized meta control hierarchy of the plurality of customized meta control hierarchies, wherein the customized meta control hierarchy is associated with the user, wherein the partial control hierarchy contains a set of active nodes along a path from a root node of the customized meta control hierarchy to the selected node in the customized meta control hierarchy and all displayable nodes associated with each one of the set of active nodes; and
        rendering the one or more controls in the portal based on the partial control hierarchy.

2. The system according to claim 1, wherein:
    the meta control hierarchy is a meta control tree.

3. The system according to claim 1, wherein:
    each of the plurality of controls can be one of: a desktop, a main book, a book, a page, and a portlet.

4. The system according to claim 1, wherein:
    the portal has a single or a multi-level menu.

5. The system according to claim 4, wherein:
the portal managing component is further operable to detect that the portal has the multi-level menu and to create a shallow hierarchy, such as a shallow tree.

6. The system according to claim 1, wherein:
each node in the set of active nodes can be identified with a label.

7. The system according to claim 1, wherein:
the portal managing component is further operable to run at least one of following lifecycle stages on each node in the partial control hierarchy: init, load, loadState, handlePostback, raiseChangeEvents, preRender, saveState, render and destroy.

8. The system according to claim 1, wherein:
the user's request can be submitted via a mouse click.

9. A method to provide portal rendering, comprising:
accepting a user's request for rendering one or more controls in a portal, wherein the one or more controls is associated with a selected node wherein the portal allows a plurality of users to access a website;
creating a meta control hierarchy with a plurality of nodes from an XML markup file of the portal, wherein the meta control hierarchy represents the plurality of controls on the portal and each node in the meta control hierarchy holds information of one of the plurality of controls;
allowing the plurality of users to customize the meta control hierarchy and create a plurality of customized meta control hierarchies, wherein each of the customized meta control hierarchy is associated with one user of the plurality of users;
compressing the plurality of customized meta control hierarchies by sharing sub-hierarchies among the plurality of customized meta control hierarchies;
creating, on one or more processors, a partial control hierarchy based on a customized meta control hierarchy of the plurality of customized meta control hierarchies, wherein the customized meta control hierarchy is associated with the user, wherein the partial control hierarchy contains a set of active nodes along the path from a root node of the customized meta control hierarchy to the selected node in the customized meta control hierarchy and all displayable nodes associated with each one of the set of active nodes; and
rendering the one or more controls in the portal based on the partial control hierarchy.

10. The method according to claim 9, wherein:
the meta control hierarchy is a meta control tree.

11. The method according to claim 9, further comprising:
detecting that the portal has a multi-level menu and creating a shallow hierarchy, such as a shallow tree.

12. The method according to claim 9, further comprising:
identifying each node in the set of active nodes with a label.

13. The method according to claim 9, further comprising:
submitting the user's request via a mouse click.

14. The method according to claim 9, further comprising:
running each node in the partial control hierarchy with at least one of following lifecycle stages: init, load, loadState, handlePostback, raiseChangeEvents, preRender, saveState, render and destroy.

15. A machine readable storage medium having instructions stored thereon that when executed cause a system to:
accept a user's request for rendering one or more controls in a portal, wherein the one or more controls is associated with a selected node, wherein the portal allows a plurality of users to access a website;
create a meta control hierarchy with a plurality of nodes from an XML markup file of the portal, wherein the meta control hierarchy represents the plurality of controls on the portal and each node in the meta control hierarchy holds information of one of the plurality of controls;
allow the plurality of users to customize the meta control hierarchy and create a plurality of customized meta control hierarchies, wherein each of the customized meta control hierarchy is associated with one user of the plurality of users;
compress the plurality of customized meta control hierarchies by sharing sub-hierarchies among the plurality of customized meta control hierarchies;
create a partial control hierarchy based on a customized meta control hierarchy of the plurality of customized meta control hierarchies, wherein the customized meta control hierarchy is associated with the user, wherein the partial control hierarchy contains a set of active nodes along the path from a root node of the customized meta control hierarchy to the selected node associated with the user's request in the customized meta control hierarchy and all displayable nodes associated with each one of the set of active nodes; and
render the one or more controls in the portal based on the partial control hierarchy.

16. The system according to claim 1, wherein:
the portal managing component supports writing a state of the partial control hierarchy directly to a user session object, wherein the state of the partial control hierarchy maintains an initial state for every node in the partial control hierarchy and updates the state once modified.

* * * * *

UNITED STATES PATENT AND TRADEMARK OFFICE
CERTIFICATE OF CORRECTION

| | | |
|---|---|---|
| PATENT NO. | : 7,747,677 B2 | Page 1 of 1 |
| APPLICATION NO. | : 11/196071 | |
| DATED | : June 29, 2010 | |
| INVENTOR(S) | : Christopher Jolley et al. | |

It is certified that error appears in the above-identified patent and that said Letters Patent is hereby corrected as shown below:

On sheet 14 of 19, in Figure 10, line 5, delete "<requestURI>" and insert -- <requestURL> --, therefor.

On sheet 15 of 19, in Figure 11, line 4, delete "requestURI" and insert -- requestURL --, therefor.

On sheet 18 of 19, in Figure 14, Box No. 1403, line 1, delete "Constructe" and insert -- Construct --, therefor.

In column 7, line 38, delete "control" and insert -- control. --, therefor.

In column 12, line 10-11, in claim 14, delete "loadstate," and insert -- loadState, --, therefor.

Signed and Sealed this
Nineteenth Day of April, 2011

David J. Kappos
*Director of the United States Patent and Trademark Office*